US006184931B1

United States Patent
Kaneda

(10) Patent No.: US 6,184,931 B1
(45) Date of Patent: *Feb. 6, 2001

(54) IMAGE PICKUP DEVICE WITH FOCUSING CONTROL

(75) Inventor: Kitahiro Kaneda, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/567,874

(22) Filed: Dec. 6, 1995

Related U.S. Application Data

(63) Continuation of application No. 08/362,757, filed on Dec. 22, 1994, now abandoned, which is a continuation of application No. 08/049,961, filed on Apr. 20, 1993, now abandoned, which is a continuation of application No. 07/712,975, filed on Jun. 10, 1991, now abandoned.

(30) Foreign Application Priority Data

Jun. 14, 1990 (JP) .................................................... 2-156702

(51) Int. Cl.⁷ ................................................ H04N 5/232
(52) U.S. Cl. .......................................... 348/345; 348/372
(58) Field of Search .................................... 348/207, 208, 348/252, 345, 349, 350, 352, 354, 355, 356, 372; 354/400, 448; H04N 5/232

(56) References Cited

U.S. PATENT DOCUMENTS

| 5,061,954 | * | 10/1991 | Toyama et al. . |
| 5,119,121 | * | 6/1992 | Kobayashi et al. . |
| 5,146,261 | * | 9/1992 | Soshi . |
| 5,162,834 | * | 11/1992 | Kichimov . |
| 5,587,842 | * | 12/1996 | Iijima et al. .......................... 359/698 |

FOREIGN PATENT DOCUMENTS

394901 * 10/1990 (EP) ................................ G02B/7/10

* cited by examiner

Primary Examiner—Tuan Ho
(74) Attorney, Agent, or Firm—Robin, Blecker & Daley

(57) ABSTRACT

There is disclosed an image pickup device provided with a focusing lens for regulating the focus state of a phototaking optical system; an encoder for detecting a region in which the focusing lens is positioned; and a control circuit for detecting, by means of the encoder, the region in which the focusing lens is positioned at the start of power supply and, if the focusing lens is not positioned in a predetermined region, releasing a drive control signal for driving the focusing lens to an initial position in the above-mentioned predetermined region.

23 Claims, 3 Drawing Sheets

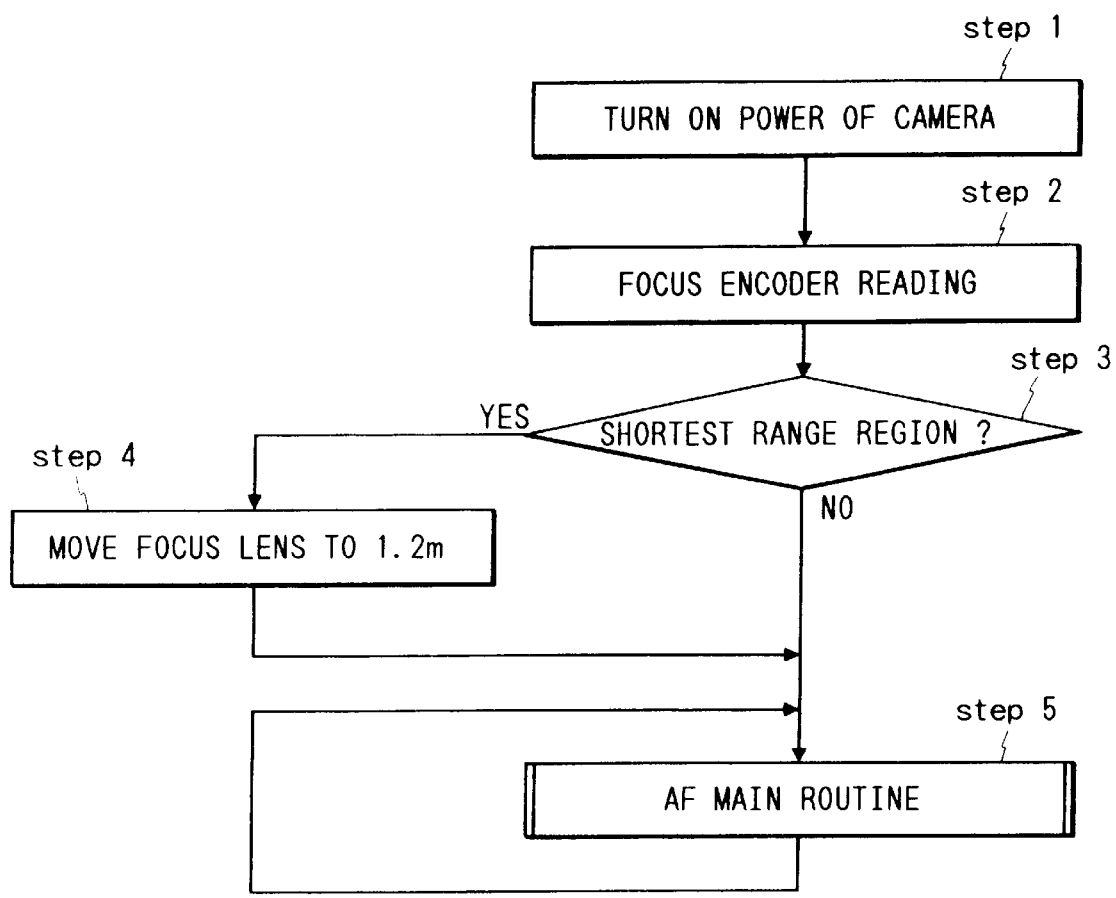

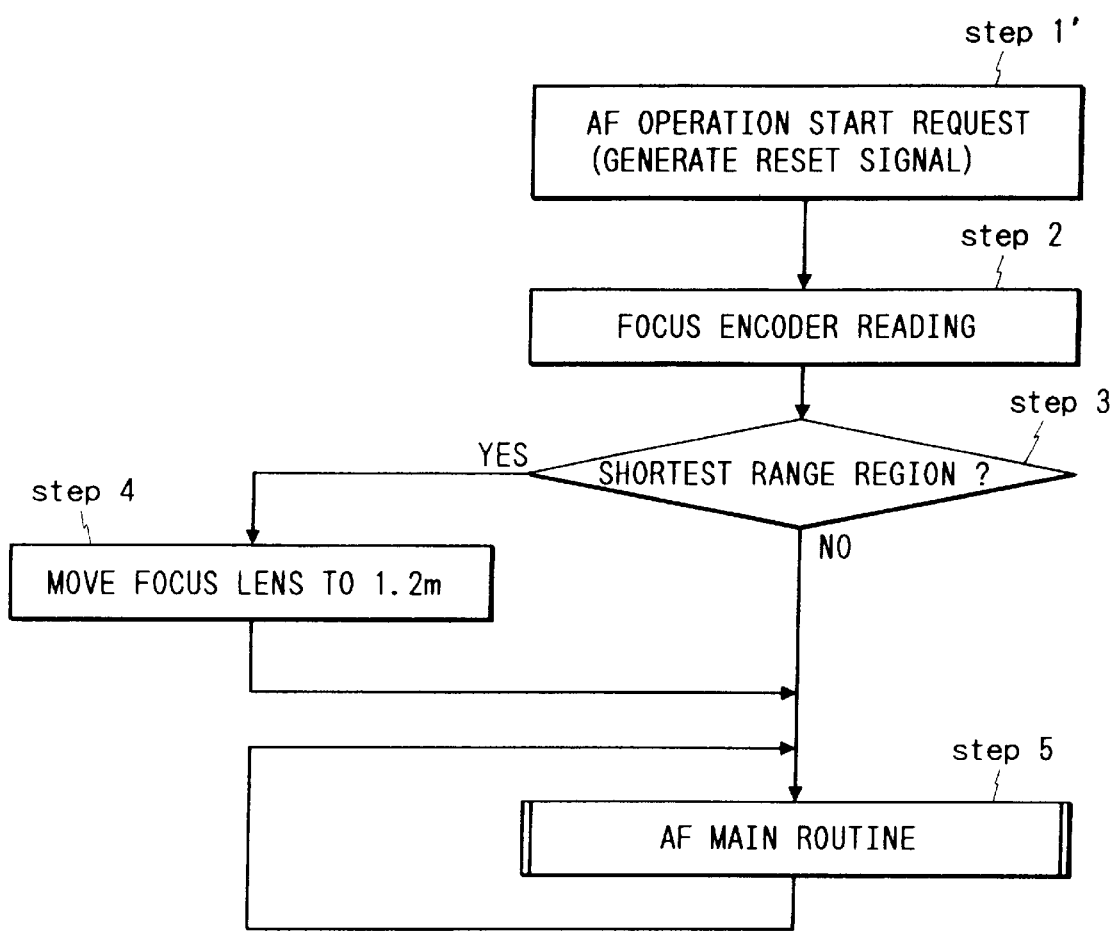

IMAGE PICKUP DEVICE WITH FOCUSING CONTROL

This is a continuation application under CRF 1.62 of prior application Ser. No. 08/362,757, filed Dec. 22, 1994, abandoned, which is a continuation of Ser. No. 08/049,961, filed Apr. 20, 1993, abandoned, which is a continuation of Ser. No. 07/712,975, filed Jun. 10, 1991, abandoned.

BACKGROUND OF THE INVENTION

1. Field of the Invention

The present invention relates to a lens control device adapted for use in an image pickup device such as a video camera or an electronic still camera.

2. Related Background Art

In the image pickup devices such as a video camera, there has conventionally been employed a focusing method of detecting the sharpness of the image frame from an image signal released from said image pickup means and controlling the position of a focusing lens so as to maximize said sharpness.

The sharpness is generally evaluated by the intensity of high frequency components extracted by a band-pass filter (BPF) from the image signal or the detected intensity of unfocused width of the object image, detected, for example, by a differentiating circuit from the image signal.

In case of taking an ordinary object, during an unfocused state with a low sharpness, the high frequency components are weak and the unfocused width of the object image is large. As the lens approaches to the focused state, the high frequency components assume a higher level and the unfocused width becomes smaller, and, in the completely in-focus state, the high frequency components assume a highest value while the detected unfocused width becomes smallest, whereby the sharpness becomes maximum.

Consequently, a focusing operation can be achieved by moving the focusing lens as fast as possible, while the sharpness is still low, in such a direction as to increase the sharpness and decelerating the focusing lens according to the increase of sharpness so as to stop the system on top of the peak of sharpness, whereby the focusing lens can be precisely stopped at the in-focus position. The automatic focusing method with such focusing lens control is generally called peak climbing automatic focusing (AF) method.

Also in association with the recent development of video cameras or the like with more complex functions, there is proposed so-called wide range automatic focusing system with a widened focusing range. In this system, the movable range of a conventional optical system is widened toward the shorter range side (macro region), thereby enabling focusing to an object at a shorter distance.

However, in the wide range automatic focusing system utilizing the above-mentioned peak climbing automatic focusing method, the focusing operation may not be conducted properly immediately after the start of power supply, if the focusing lens is positioned at the shortest object range side when the power supply is previously turned off. For example, there may be encountered drawbacks that the focusing lens is stopped at an out-of-focus position or that the focusing operation requires a long time. The object to be focused immediately after the start of power supply is empirically most often positioned in the ordinary distance range, while the focusing lens in the shorter object distance region requires a larger amount of movement, for a given change in the object distance, in comparison with the focusing operation in the ordinary object distance region. For these reasons, the system is often unable to follow the object in the ordinary object distance region while the focusing lens is in the shorter object distance region, thus eventually requiring a long time for escaping from such state or erroneously stopping the focusing lens before the focusing operation is completed.

SUMMARY OF THE INVENTION

In consideration of the technical drawbacks of the prior technology explained above, a first object of the present invention is to provide an image pickup device capable of proper focusing to the object without erroneous operation.

A second object of the present invention is to provide an image pickup device capable, in case the lens is in an inappropriate position outside an ordinary range at the start of power supply, of forcedly moving said lens into an appropriate range, thereby enabling an exact focusing operation without error.

The foregoing objects can be attained, according to a preferred embodiment of the present invention, by an image pickup device comprising focusing means for regulating the focus state of a phototaking optical system, detection means for detecting a region in which the focusing means is positioned, and control means for detecting a region in which the focusing means is positioned at the start of power supply by means of the detection means, and, if the focusing means is not in a predetermined region, releasing a drive signal for driving the focusing means to an initial position in said predetermined region.

Also according to another preferred embodiment of the present invention, there is disclosed an image pickup device comprising focusing means for automatically focusing a phototaking optical system by detecting the focus state thereof, detection means for detecting a region in which the focusing means is positioned, and control means for detecting, by means of said detection means, a region in which the focusing means is positioned prior to the start of function thereof, and, if said focusing means is not positioned in a predetermined region, releasing a drive signal for driving the focusing means to an initial position in the predetermined region.

A third object of the present invention is to provide an image pickup device equipped with so-called wide range automatic focusing system capable of automatic focusing operation from an ordinary region to a macro region, wherein the device is capable of detecting the position of a focusing lens at the start of power supply to a camera and effecting an automatic focusing operation after the focusing lens is initialized to a predetermined appropriate position, so that there can be avoided drawbacks such as inability of focusing to an object in the ordinary region or a prolonged time required for focusing even if the focusing lens is initially positioned in the macro region, and an exact and prompt focusing operation can be always ensured.

Still other objects of the present invention, and the features thereof, will become fully apparent from the following description to be taken in conjunction with the attached drawings.

BRIEF DESCRIPTION OF THE DRAWINGS

FIG. 1 is a block diagram of an image pickup device of the present invention, applied to an automatic focusing device for a video camera or the like;

FIG. 2 is a flow chart of the control sequence of an automatic focusing device of the present invention; and FIG. 3 is a flow chart of another example of the control sequence in an automatic focusing device of the present invention.

DETAILED DESCRIPTION OF THE PREFERRED EMBODIMENTS

Figure 1:
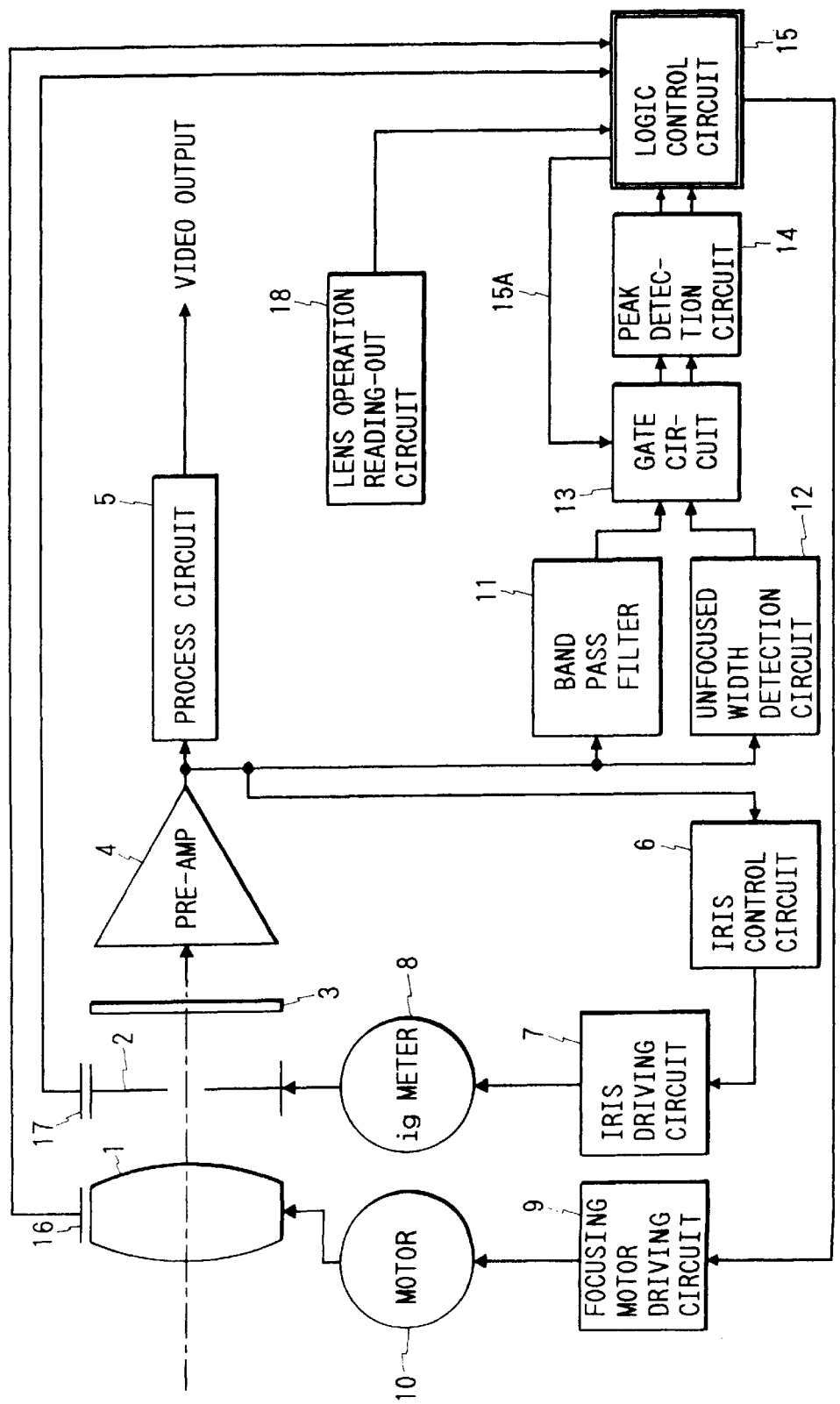

Now the present invention will be clarified in greater detail by an embodiment thereof, in which the image pickup device of the present invention is applied to a video camera, with reference to attached drawings.

FIG. 1 is a block diagram of an automatic focusing device of the present invention, applied, for example, to a video-camera.

A focusing lens 1 is controlled by a focusing motor 10, which is driven by a focusing motor driving circuit 9. Said focusing lens 1 is rendered movable in an ordinary region corresponding to the object distance from 1.2 meters to infinity, and a macro region corresponding to the object distance from a shortest distance of 0.6 meters to 1.2 meters.

A diaphragm (iris) 2 for controlling the amount of incident light is controlled by an ig meter 8 which is driven by an iris driving circuit 7. There are provided; an image sensor 3, such as a CCD, for photoelectrically converting an object image, focused on an image taking plane by the focusing lens 1, into an image signal; a preamplifier 4 for amplifying the image signal from the image sensor 3 to a predetermined level; and a process circuit 5 for converting the image signal from the pre-amplifier 4 into a standard television signal by effecting predetermined processes such as gamma correction, blanking, addition of synchronization signals, etc., and releasing said television signal from a video output terminal. Said television signal from the process circuit 5 is supplied, for example, to a video recorder or a monitor consisting of an electronic view finder, which are not shown in FIG. 1.

An iris control circuit 6 receives the image signal from the pre-amplifier 4, and automatically controls the ig meter 8 through an iris driving circuit 7 thereby controlling the aperture of the iris 2 in such a manner that said image signal is maintained at a predetermined constant level.

A band-pass filter 11 extracts, from the image signal supplied from the pre-amplifier 4, the high frequency components necessary for focus state detection. A detection circuit 12 for the unfocused width (width of edge portion) of the object image, effects the focus state detection, utilizing a fact that the unfocused width of the object image becomes smaller as the optical system approaches to the in-focus state. The focus state detecting method utilizing such unfocused width detecting circuit will not be explained in detail as it is already known for example by the Japanese Laid-open Patent Application No. 62-103616.

A gate circuit 13 transmits only the signal corresponding to a designated area in the image frame, by gating the output signal of the band pass filter 11 and the unfocused width detecting circuit 12. Said gate circuit 13 serves to only transmit the signal corresponding to a designated area in the video signal of a field according to gate pulses supplied from a logic control circuit 15 to be explained later, thereby setting an area for extraction of the high frequency components, namely, an area for focus state detection, at an arbitrary position within the image frame.

A peak detection circuit 14 serves to detect the peak value of the high frequency components extracted by the band pass filter 11 from the image signal corresponding to the focus state detecting area defined by the gate circuit 13, and the minimum value of the unfocused width released from the unfocused width detecting circuit 12, and also to detect the horizontal and vertical positions, within the image frame, of the point where the peak value of the aforementioned high frequency components is obtained. Said peak detection circuit thus detects, within a field period, the peak value of the high frequency components, the minimum value of the unfocused width, and a block in which said peak value is detected among plural blocks divided in the horizontal and vertical directions in the focus state detecting area, and releases the horizontal and vertical coordinates of said detected block.

A focus encoder 16, for example of optical type, detects the position of the focusing lens 1. In the present embodiment, it detects the position of the focusing lens 1 in the following four areas: shortest object distance end (0.6 m), 0.6~1.2 m (short object distance region or macro region), 1.2 m ~∞ ordinary object distance region), and infinite object distance (∞). Also the automatic focusing system in which the automatic focusing operation is expanded to cover the ordinary distance region and the short distance region will be called the wide range automatic focusing system.

An iris encoder 17 detects the aperture of the iris 2, and this detected information is supplied to the logic control circuit 15.

A lens operation reading circuit 18 reads operations for various controls of the lens, for example, an operation for automatic focusing in the macro region or an operation for a high-speed electronic shutter releasing, and sends the corresponding information to the logic control circuit 15.

The logic control circuit 15, for controlling the entire system, is composed for example of a microcomputer provided therein with unrepresented input/output port, A/D converter, read-only memory (ROM), random access memory (RAM), etc.

Said logic control circuit 15 fetches the peak value, detected by the peak detection circuit 14, of the high frequency components of a field period obtained from the band pass filter 11, the coordinates of said peak value, the unfocused width obtained from the unfocused width detecting circuit 14 and the information from various encoders and processes this information according to a predetermined algorithm, in consideration of the focus state detecting area defined in the image frame by the gate circuit 13, thereby setting the position, size, moving direction and moving speed of said focus state detecting area in the image frame, based on the time-sequential change of said information, thus achieving the pursuit of the object, and also operating the moving direction and speed of the focusing lens to reach the in-focus position.

More specifically, it detects the movement of the object in every field, based on the peak value of the high frequency components in a field period obtained from the band pass filter 11 and the coordinates of said peak value, and controls the gate circuit 13 by sending a gate pulse thereto in such a manner as to set the focus state detecting area around thus varying peak position or namely the object position, thereby allowing the transmission of the image signal only in said focus state detecting area.

Also, the logic control circuit 15 effects focusing by detecting the focus state of the object, based on the image signal corresponding to the selected focus state detecting area. More specifically, it fetches the unfocused width information supplied from the unfocused width detecting circuit 12 and the peak value information on the high frequency components supplied from the band pass filter 11, and supplies the focusing motor driving circuit 9 with control signals indicating the rotating direction, rotating speed and start/stop of the focusing motor 10, in order to move the focusing lens 1 to a position where the unfocused width and the peak value of the high frequency components within a field period respectively become minimum and maximum.

In the course of this operation, according to the level of focus and to the depth of focus calculated from the aperture value detected by the iris encoder 17, the logic control circuit 15 sends a gate control signal 15A to the gate circuit 13 thereby controlling the size, moving range and moving response speed of the focus state detecting area. In this manner the focusing operation can be continued with automatic pursuit on a moving object.

In the present invention, the focus state detection utilizes the unfocused width signal released from the unfocused width detecting circuit 12 and the peak value of the high frequency components obtained from the band pass filter 11, for the following reason.

The unfocused width of the object image, becoming smaller as the system approaches to the in-focus position and smallest at said in-focus position, can provide a high precision in the focus state detection as it is scarcely affected by the contrast of the object, but it has a narrow dynamic range and cannot provide a sufficient detecting accuracy when the system is significantly distanced from the in-focus position.

On the other hand, the high frequency components have a larger dynamic range and can provide an output corresponding to the level of focusing even when the system is distanced from the in-focus position, but the precision of focusing is inferior to that of the unfocused width information as the high frequency components are significantly affected by the contrast of the object.

Consequently, by combining these two parameters, there can be obtained a focus state detecting method having a wide dynamic range and also showing a high precision of focus state detection in the vicinity of the in-focus position.

In the following there will be explained the control operation of the logic control circuit 15 in the image pickup device shown in FIG. 1, with reference to a flow chart shown in FIG. 2.

In FIG. 2, a step 1 is a reset signal input routine for the logic control circuit 15, which is reset and initializes itself by the input of a reset signal.

Said reset signal is generally generated when the power supply to the camera system is turned on.

Steps 2, 3, 4 and 5 constitute a principal part of the present invention. The step 2 is a routine for reading the position information of the focusing lens 1 at the start of functioning of the logic control circuit 15. The focusing lens position information (shortest distance end, macro region, ordinary region, infinity distance) detected by the focus encoder 16 is fetched by the logic control circuit 15.

The step 3 is a routine for discriminating whether the focusing lens is in the short distance region, while the step 4 is a routine for forcedly moving the focusing lens 1 from the macro region to the ordinary region, and the step 5 is an AF main routine for driving the focusing lens to the in-focus position by a peak climbing automatic focusing operation, based on the high frequency component level signal and the unfocused width signal respectively supplied by the band pass filter 11 and the unfocused width detecting circuit 12 as explained before.

When the step 1 detects that the power supply to the camera has been turned on, the sequence proceeds to the step 2, in which the information on the current position of the focusing lens 1, detected by the focus encoder 16, is supplied to the logic control circuit 15.

The logic control circuit 15 discriminates, in the step 3, whether the focusing lens 1 is currently positioned in the ordinary region or the macro region, and, if in the ordinary region, it initiates the automatic focusing operation in the step 5. On the other hand, if the step 3 identifies that the focusing lens is in the macro region, the sequence proceeds to the step 4 for forcedly moving the focusing lens 1 into the ordinary region, for example, to a position therein corresponding to an object distance of 1.2 m. Then, the step 5 sets the initial position of the focusing lens at 1.2 m and starts the automatic focusing operation.

The reason for driving the focusing lens into the ordinary region immediately after the start of power supply, namely prior to the start of automatic focusing, is as follows.

In the wide range automatic focusing system as explained above, the amount of movement of the focusing lens for a given change in the object distance is larger in the short distance region than in the ordinary distance region. Therefore, if the focusing lens enters the short distance region for some reason and is to be focused to an object in the ordinary distance region, the focusing system tends to lose the object, thus often resulting in erroneous operations, such as a long time required for focusing or the focusing lens being stopped without proper focusing.

Also, in the actual use of a video camera, the objects to be taken are mostly located in the ordinary region, and it is rather rare to start the image taking operation in the macro region immediately after the start of power supply.

Consequently, according to the present invention, the automatic focusing operation is always started with the focusing lens in the ordinary region, at the start of image taking operation immediately after the power supply is turned on, thereby preventing erroneous operations which are often encountered when the automatic focusing operation is initiated from the macro area and conducted to focus to an object in the ordinary distance region.

Thus the present invention allows one to achieve an exact wide range automatic focusing operation even if the focusing lens is initially positioned in the short distance region, by detecting the position of said focusing lens at the start of power supply and maintaining said focusing lens in an appropriate position.

In the above-explained embodiment, it is assumed that the automatic focusing mode is started in response to the start of power supply, but, in a device requiring a separate operation for entering the automatic focusing mode, the operation for setting the focusing lens at the initial position may be conducted in response to said separate operation for entering the automatic focusing mode.

FIG. 3 is a flow chart of the control sequence in such case.

Said flow chart is different from that in FIG. 2, only in a fact that the step 1 for releasing the reset signal in response to the start of power supply is replaced by a step 1'. Other steps are same as those in FIG. 2 and will not, therefore, be explained further.

More specifically, in said step 1', a reset signal is generated in response to the request for starting the automatic focusing operation, whereby the step 2 is executed to reset the automatic focusing system prior to the start of the automatic focusing operation thereof.

In the foregoing embodiments the short distance region is defined as 0.6 m to 1.2 m, but such region is not limitative. For example, in case of an optical system with a wider short distance region, said region may be defined as 0 to 1.2 m. Thus, said region may be determined in consideration of the characteristics of the optical system to be employed.

Also in the foregoing embodiments, the initial position of the focusing lens is defined corresponding to an object distance of 1.2 m, but this is not limitative and can be determined in consideration of the characteristics of the optical system to be employed, for example, at a position corresponding to a larger object distance, in case of an optical system of larger magnification.

As explained in the foregoing, the image pickup device of the present invention, provided with so-called wide range automatic focusing system capable of automatic focusing operation over the ordinary object distance region and the macro region, is so constructed as to detect the position of the focusing lens at the start of power supply to the camera and to set the focusing lens at an appropriate initial position, prior to the start of the automatic focusing operation, thereby preventing the drawbacks of inability of focusing to the object in the ordinary region or a long time required for focusing even when the focusing lens is, for example initially positioned in the macro region, and constantly ensuring an exact and prompt automatic focusing operation.

What is claimed is:

1. An image pickup device comprising:
   A) automatic focusing means for continuously adjusting a focus state of a phototaking optical system by driving said phototaking optical system in a predetermined moving range consisting of a plurality of regions, said automatic focusing means being operable in a mode of operation wherein said focus state is continuously adjusted according to a common operating algorithm that does not vary from region to region in said predetermined moving range;
   B) detection means for detecting a region in which said optical system is positioned; and
   C) control means, connected to said detection means, for detecting powering-on of the image pickup device and, in response to said detected powering-on, determining on the basis of a signal from said detection means whether said phototaking optical system is positioned in a normal region at a time when said powering-on is detected, said control means immediately activating said mode of operation of said focusing means if said optical system is positioned in said normal region at said time when said powering-on is detected, and if said optical system is not positioned in said normal region at said time when said powering-on is detected, said control means generates a drive control signal for driving said optical system to a predetermined initial position in said normal region and then activates said mode of operation of said focusing means.

2. An image pickup device according to claim 1, wherein said focusing means includes means for driving a focusing lens, and said detection means is composed of a position encoder for detecting the object distance of said focusing lens with a predetermined resolving power.

3. An image pickup device according to claim 2, wherein said control means is adapted, if the focusing lens is not positioned in said normal region at said time when said powering-on is detected, to forcedly move said focusing lens to an initial position in said normal region.

4. An image pickup device according to claim 3, wherein said focusing means is capable of moving the focusing lens in an ordinary image taking object distance region and a macro image taking object distance region, and said normal region is said ordinary image taking object distance region.

5. An image pickup device according to claim 4, wherein said initial position is a position corresponding to an object distance of 1.2 meters in the ordinary image taking object distance region.

6. An image pickup device comprising:
   A) focusing means for automatically adjusting a focus state of a phototaking optical system continuously in a predetermined moving range of said phototaking optical system, consisting of a plurality of regions, said focusing means being operable in a mode of operation wherein said focus state is continuously adjusted by a common operating algorithm that does not vary from region to region in said predetermined moving range;
   B) detection means for detecting a region in which said phototaking optical system is positioned; and
   C) control means, connected to said detection means, for detecting powering on, determining on the basis of a signal from said detection means whether said phototaking optical system is positioned in a normal region at a time when said powering on is detected, said control means immediately activating said mode of operation of said phototaking optical system if said phototaking optical system is positioned in said normal region at said time when said powering on is detected, and if said phototaking optical system is not positioned in said normal region at said time when said powering on is detected, said control means generates a drive control signal for driving said phototaking optical system continuously to an initial position in said normal region and then activates said mode of operation of said focusing means.

7. An image pickup device according to claim 6, wherein said detection means is adapted to detect whether the object distance of said phototaking optical system is in an ordinary image taking object distance region or in a macro image taking object distance region, and said control means is adapted, if the object distance of said phototaking optical system is in said macro region at the time when the request signal requesting commencement of an automatic focusing operation is detected, to forcedly move said phototaking optical system to an initial position in said ordinary region.

8. An image pickup device according to claim 7, wherein said initial position is a position corresponding to an object distance of 1.2 meters in said ordinary image taking object distance region.

9. A video camera comprising:
   A) a focus lens;
   B) position discrimination means for dividing a moving range of said focus lens into a plurality of regions and discriminating a region in which said focus lens is located;
   C) focus detecting means for detecting a focus state of said focus lens and outputting a focus detection signal corresponding to the focus state; and
   D) control means operable in a mode of operation wherein automatic focus adjustment is performed according to a common operating algorithm that does not vary in dependence on the region in which said focus lens is located, said automatic focus adjustment being performed by moving said focus lens continuously in said moving range on the basis of said focus detection signal;
   said control means determining whether said focus lens is located in a normal region in said plurality of regions at a time when power is turned on and, if said focus lens is not located in said normal region at said time, driving said focus lens to said normal region before operation of said control means in said mode of operation is started and then starting the operation of said control means in said mode of operation.

10. A video camera according to claim 9, wherein said plurality of regions includes a normal region corresponding to an object distance from 1.2 meters to infinity and a macro region corresponding to the object distance less than 1.2 meters.

11. A video camera according to claim 10, wherein said control means, in case said focus lens is located in said macro region at said time when said mode of operation of said control means is to be started, drives said focus lens to a predetermined initial position in said normal region and then starts said mode of operation.

12. A video camera according to claim 9, further comprising image pickup means for converting an object image focused by said focus lens into an electrical signal and wherein said focus detection means extracts said focus detection signal corresponding to the focus state from an image pickup signal output from said image pickup means.

13. A video camera according to claim 11, wherein said focus detection signal is a high frequency component of said image pickup signal.

14. A video camera comprising:
A) a focus lens for performing focus adjustment by moving in a moving range which is divided into a plurality of regions;
B) focus detection means for detecting a focus state of said focus lens and outputting a focus detection signal corresponding to the focus state;
C) focus control means operable in a mode of operation wherein automatic focus adjustment is performed according to a common operating algorithm that does not vary in dependence on the region in which said focus lens is located, said automatic focus adjustment being performed by moving said focus lens continuously in said moving range; and
D) control means for receiving a reset signal generated in response to a powering-on and, in case the focus lens is not located in a normal region of said plurality of regions when the reset signal is received, for driving said focus lens to said normal region and for prohibiting operation of said focus control means in said mode of operation until said focus lens is driven to said normal region.

15. A video camera according to claim 14, wherein said plurality of regions includes a normal region corresponding to an object distance from 1.2 meters to infinity and a macro region corresponding to the object distance less than 1.2 meters.

16. A video camera according to claim 14, wherein said control means, in case that said focus lens is located in said macro region when the operation of said focus control means is started, drives said focus lens to a predetermined initial position in said normal region and activates said focus control means thereafter.

17. A lens control apparatus comprising:
A) automatic focusing means for continuously adjusting a focus condition of a lens by driving said lens in a predetermined moving range consisting of a plurality of regions, said focusing means being operable in a mode of operation wherein said focus condition is continuously adjusted according to a common operating algorithm that does not vary from region to region in said predetermined moving range;
B) detection means for detecting a region in which said lens is positioned; and
C) control means, in response to power-on of said apparatus, for controlling said lens on the basis of an output of said detection means so as to immediately activate said mode of operation of said focusing means if said lens positioned in said normal region at the power-on of said apparatus and generate a driving signal for moving said lens to a predetermined initial position in said normal region and then activate said mode of operation of said focusing means if said lens is not positioned in said normal region.

18. An apparatus according to claim 17, wherein said lens is a focusing lens and said detecting means is composed of a position encoder for detecting the object distance of said focusing lens.

19. An apparatus according to claim 18, wherein said control means, in response to powering-on state, controls said focusing lens on the basis of an output of said position encoder so as to immediately activate said mode of operation of said focusing means if said focusing lens is positioned in said normal region at the time of the power-on and forcedly move said focusing lens to a predetermined initial position in said normal region and then activate said mode of operation of said focusing means if said focusing lens is not positioned in said normal region.

20. An apparatus according to claim 18, wherein said focusing means detects a focus condition on the basis of a high frequency component of an image signal and moves said focusing lens to an in-focus position according to the detected focus condition.

21. An apparatus according to claim 17, wherein said predetermined moving range includes a macro region except to said normal range.

22. An apparatus according to claim 21, wherein said initial position is a position corresponding to an object distance of 1.2 meters in the ordinary image taking object distance region.

23. An apparatus according to claim 22, wherein said macro region is from an object distance of 0.6 meters to an object distance of 1.2 meters.

* * * * *